United States Patent
Lee et al.

(10) Patent No.: US 12,110,814 B2
(45) Date of Patent: Oct. 8, 2024

(54) APPARATUS AND METHOD FOR CONTROLLING A CAM

(71) Applicant: Vitesco Technologies GmbH, Hannover (DE)

(72) Inventors: YoungMo Lee, Munich (DE); HaMyeong Song, Munich (DE); JaeWon Choi, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 321 days.

(21) Appl. No.: 17/420,777

(22) PCT Filed: Jan. 2, 2020

(86) PCT No.: PCT/EP2020/050008
§ 371 (c)(1),
(2) Date: Jul. 6, 2021

(87) PCT Pub. No.: WO2020/141189
PCT Pub. Date: Jul. 9, 2020

(65) Prior Publication Data
US 2022/0065141 A1    Mar. 3, 2022

(30) Foreign Application Priority Data
Jan. 4, 2019  (KR) ........................ 10-2019-0001337

(51) Int. Cl.
*F01L 1/344*  (2006.01)
*F01L 13/00*  (2006.01)
(Continued)

(52) U.S. Cl.
CPC ......... *F01L 1/3442* (2013.01); *F01L 13/0015* (2013.01); *F02D 13/0215* (2013.01);
(Continued)

(58) Field of Classification Search
CPC ........... F01L 1/3442; F01L 2001/34426; F01L 2201/00; F01L 2800/00; F01L 2820/041;
(Continued)

(56) References Cited

U.S. PATENT DOCUMENTS 5,562,071 A   10/1996   Urushihata ................. 123/90.15
5,572,959 A   11/1996   Hedelin .......................... 123/48
(Continued)

FOREIGN PATENT DOCUMENTS

CN   101387210 A   3/2009   ................ F01L 1/34
CN   101548067 A   9/2009   ................ F01L 1/34
(Continued)

OTHER PUBLICATIONS

Search Report for International Application No. PCT/EP2019/060865, 13 pages, May 7, 2019.
(Continued)

*Primary Examiner* — Wesley G Harris
(74) *Attorney, Agent, or Firm* — Slayden Grubert Beard PLLC

(57) ABSTRACT

Various embodiments of the teachings herein include a method for controlling a cam using an ECU (electronic control unit) comprising: learning a holding region in which linearity is not ensured by increasing or decreasing a PWM signal while the cam maintains a holding state; based on the results of the learning, generating a final PWM signal; and transmitting the final PWM signal to an oil control valve. The final PWM signal comprises a sum of a minimum PWM signal for the cam to leave the holding region and a control PWM signal for the cam to reach a desired position.

8 Claims, 3 Drawing Sheets

(51) Int. Cl.
   *F02D 13/02* (2006.01)
   *F02D 41/24* (2006.01)
   *F02D 41/00* (2006.01)
   *F02D 41/20* (2006.01)

(52) U.S. Cl.
   CPC ..... *F02D 41/2464* (2013.01); *F01L 2001/34426* (2013.01); *F01L 2001/3443* (2013.01); *F01L 2001/34433* (2013.01); *F01L 2201/00* (2013.01); *F01L 2800/00* (2013.01); *F01L 2820/041* (2013.01); *F02D 2041/001* (2013.01); *F02D 2041/2027* (2013.01); *F02D 2041/2055* (2013.01); *Y02T 10/12* (2013.01)

(58) Field of Classification Search
   CPC ..... F01L 2001/3443; F01L 2001/34469; F01L 2820/042; F02D 41/2464; F02D 2041/2027
   USPC .......................................... 123/90.15, 90.17
   See application file for complete search history.

(56) References Cited

U.S. PATENT DOCUMENTS

| | | | |
|---|---|---|---|
| 6,367,437 B2 | 4/2002 | Nakamura et al. | 123/90.17 |
| 7,403,849 B1 | 7/2008 | Watanabe et al. | 701/102 |
| 8,015,957 B2 * | 9/2011 | Wada | F01L 1/3442 |
| | | | 123/90.31 |
| 8,037,855 B2 * | 10/2011 | Shikata | F02D 13/0219 |
| | | | 123/90.15 |
| 8,225,763 B2 | 7/2012 | Nakano et al. | 123/90.17 |
| 9,840,943 B2 | 12/2017 | Rollinger | F01L 1/34409 |
| 11,008,903 B2 * | 5/2021 | Mitsutani | F01L 1/3442 |
| 2003/0000489 A1 * | 1/2003 | Majima | F01L 1/34 |
| | | | 123/90.17 |
| 2003/0196618 A1 | 10/2003 | Simpson | 123/90.15 |
| 2007/0266976 A1 | 11/2007 | Nagashima | 123/90.17 |
| 2009/0151671 A1 | 6/2009 | Kobaishi | 123/90.15 |
| 2014/0251247 A1 | 9/2014 | Tewes | F01L 1/344 |
| 2015/0354468 A1 | 12/2015 | Kim | 123/90.16 |
| 2017/0145871 A1 | 5/2017 | Stowaser | F01L 1/344 |

FOREIGN PATENT DOCUMENTS

| | | | |
|---|---|---|---|
| CN | 101560894 A | 10/2009 | F01L 1/34 |
| JP | H0914457 | 1/1997 | F16J 15/447 |
| JP | 2001055933 A | 2/2001 | F02D 13/02 |
| JP | 2001254638 A | 9/2001 | F01L 1/34 |
| JP | 2002138863 | 5/2002 | F02D 13/02 |
| JP | 2003314228 | 11/2003 | F01L 1/34 |
| JP | 3546700 B2 | 7/2004 | F01L 1/34 |
| JP | 2008190385 A | 8/2008 | F01L 1/34 |
| JP | 2015232320 A | 12/2015 | F02D 13/02 |
| KR | 950702276 | 6/1995 | F02B 33/36 |
| KR | 20140111615 | 9/2014 | F01L 1/34 |
| KR | 101567226 B1 | 11/2015 | F01L 1/34 |
| KR | 10-1885454 | 1/2017 | F01L 1/344 |

OTHER PUBLICATIONS

Search Report for KR Application No. 10-2019-0001337, 2 pages, Oct. 29, 2018.

Chinese Office Action, Application No. 202080007891.7, 13 pages, Oct. 19, 2022.

Chinese Office Action, Application No. 202080007891.7, 5 pages, Jun. 29, 2023.

* cited by examiner

APPARATUS AND METHOD FOR CONTROLLING A CAM

CROSS-REFERENCE TO RELATED APPLICATIONS

This application is a U.S. National Stage Application of International Application No. PCT/EP2020/050008 filed Jan. 2, 2020, which designates the United States of America, and claims priority to KR Application No. 10-2019-0001337 filed Jan. 4, 2019, the contents of which are hereby incorporated by reference in their entirety.

TECHNICAL FIELD

The present disclosure relates to mechanical linkages. Various embodiments include apparatuses and/or methods for controlling a cam.

BACKGROUND

In order to trap air and fuel inside a cylinder and combust same, an intake valve and exhaust valve have to open and close at the right time and position, and the control of such an intake valve and exhaust valve is chiefly implemented by a method in which a PWM signal is applied to the engine oil and a solenoid valve. A system for manipulating the advance/retardation of a cam using engine oil reacts sensitively to the pressure and temperature of the oil. During such control, the responsiveness of the cam, which has a major influence on engine performance, depends entirely on PWM control, and, in such instances, it can happen that responsiveness is lacking or permanent deviation from the target position occurs due to the PWM, which is set for each and every condition, being insufficient or excessive.

SUMMARY

The phenomenon described above occurs, at least in part, because the typical PWM diagram for controlling the cam is not perfectly linear and, in particular, there is a marked problem in the holding PWM region for maintaining the current position. Various solutions to this challenge incorporating teachings of the present disclosure include a method for controlling a cam by means of an ECU (electronic control unit) comprising the steps of: learning the holding region in which linearity is not ensured by performing an operation of increasing or decreasing a PWM signal when the cam maintains a holding state; and based on the results of the learning, generating a final PWM signal, which is the sum of a minimum PWM signal for the cam to leave the holding region and a control PWM signal for the cam to reach a desired position, and outputting same to an oil control valve.

In some embodiments, a method includes the step of the ECU starting the learning when the cam is operating normally, by detecting the phase of the cam received from the cam position sensor.

In some embodiments, the learning step comprises the steps of: increasing the PWM signal if the cam is positioned in a target area; halting the increase of the PWM signal the instant the position of the cam changes whilst increasing the PWM signal, and storing the PWM signal, the increase of which has been halted, as a holding advance region among the engine conditions; decreasing the PWM signal in the holding advance region; halting the decrease of the PWM signal the instant the position of the cam changes whilst decreasing the PWM signal, and storing the PWM signal, the decrease of which has been halted, as a holding retard region among the engine conditions; and defining the average of the PWM signal in the holding advance region and the PWM signal in holding retard region as a learned value of the holding region.

In some embodiments, the step of storing as a holding advance region comprises the steps of: halting the increase of the PWM signal the instant the position of the cam changes whilst increasing the PWM signal, in order to stop the movement of the cam; decreasing the PWM signal by a fixed amount in order to maintain the holding of the cam; and storing the PWM signal, which has been decreased by the fixed amount, as a holding advance region among the engine conditions.

In some embodiments, the step of storing as a holding retard region comprises the steps of: halting the decrease of the PWM signal the instant the position of the cam changes whilst decreasing the PWM signal, in order to stop the movement of the cam; increasing the PWM signal by a fixed amount in order to maintain the holding of the cam; and storing the PWM signal, which has been increased by the fixed amount, as a holding retard region among the engine conditions.

As another example, some embodiments include an apparatus for controlling a cam by means of an ECU (electronic control unit), the apparatus comprising: a learning unit for learning the holding region in which linearity is not ensured by performing an operation of increasing or decreasing the PWM signal when the cam maintains a holding state; and a control unit which, based on the results of the learning, generates a final PWM signal, which is the sum of a minimum PWM signal for the cam to leave the holding region and a control PWM signal for the cam to reach a desired position, and outputs same to an oil control valve.

In some embodiments, there is a cam position sensor for detecting the phase of the cam, wherein the learning unit starts learning when the cam is operating normally by detecting the phase of the cam received from the cam position sensor.

In some embodiments, the learning unit: increases the PWM signal if the cam is positioned in a target area; halts the increase of the PWM signal the instant the position of the cam changes whilst increasing the PWM signal, and stores the PWM signal, the increase of which has been halted, as a holding advance region among the engine conditions; decreases the PWM signal in the holding advance region; halts the decrease of the PWM signal the instant the position of the cam changes whilst decreasing the PWM signal, and stores the PWM signal, the decrease of which has been halted, as a holding retard region among the engine conditions; and defines the average of the PWM signal in the holding advance region and the PWM signal in holding retard region as a learned value of the holding region.

In some embodiments, the learning unit: during the storing as the holding advance region, halts the increase of the PWM signal the instant the position of the cam changes whilst increasing the PWM signal, in order to stop the movement of the cam; decreases the PWM signal by a fixed amount in order to maintain the holding of the cam; and stores the PWM signal, which has been decreased by the fixed amount, as a holding advance region among the engine conditions.

In some embodiments, the learning unit: during the storing as the holding retard region, halts the decrease of the PWM signal the instant the position of the cam changes whilst decreasing the PWM signal, in order to stop the movement of the cam; increases the PWM signal by a fixed amount in order to maintain the holding of the cam; and stores the PWM signal, which has been increased by the fixed amount, as a holding retard region among the engine conditions.

BRIEF DESCRIPTION OF THE DRAWINGS

Other aspects, features, and advantages aside from the ones mentioned above are described based on the drawings, claims, and detailed description below.

DETAILED DESCRIPTION

Figure 1:
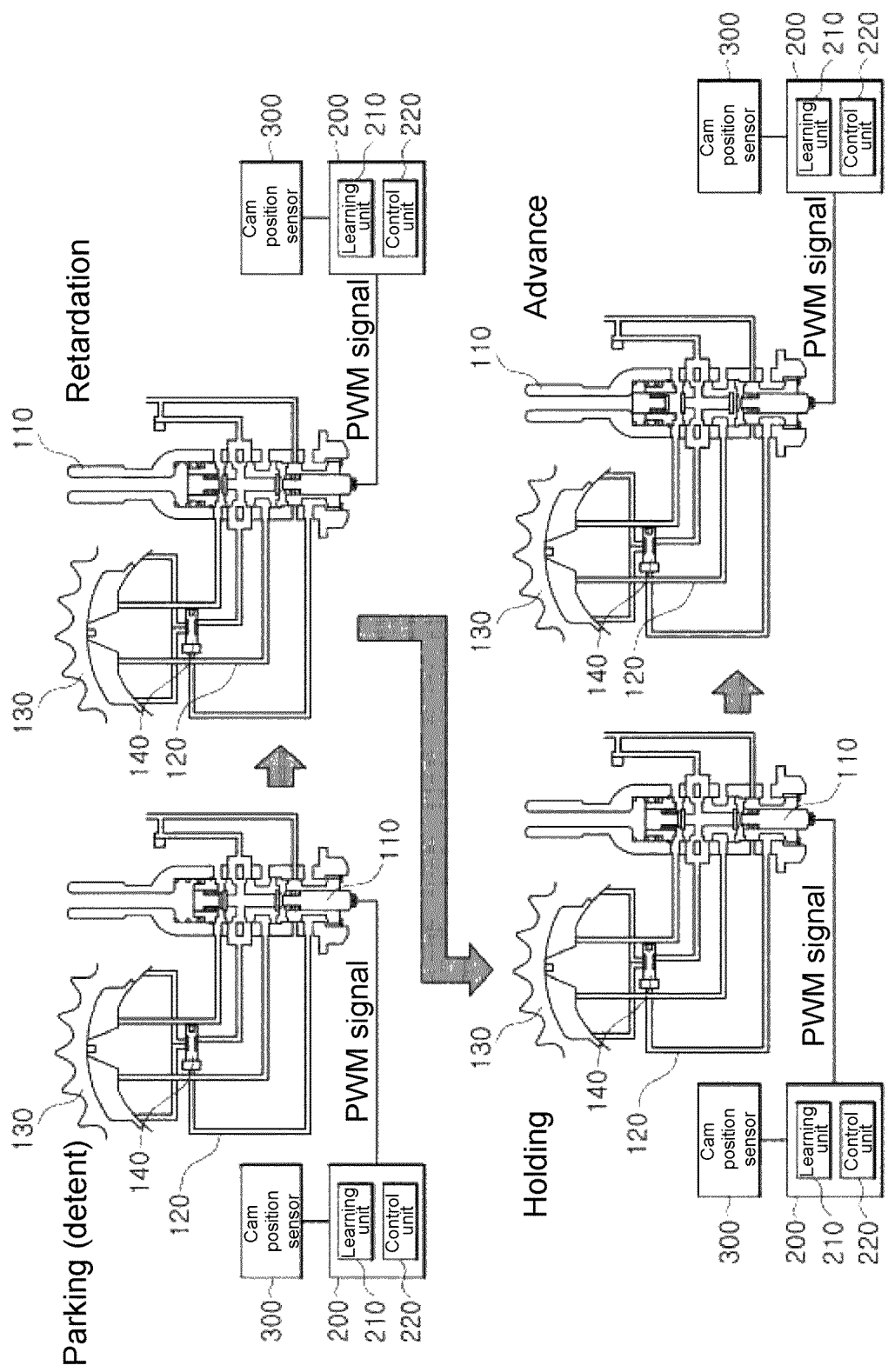
FIG. 1 is a drawing which has been drawn to describe, in general terms, an example cam control apparatus incorporating teachings of the present disclosure.

The teachings of the present disclosure may be used to engage the abovementioned problems and/or limitations. The teachings herein may improve engine performance on the basis of correct responsiveness by accurately calculating the PWM required when changing the cam position; wherein, when the cam maintains a holding state, the holding PWM (pulse width modulation) range, in which the PWM moves slightly such that linearity is not ensured, is calculated and then applied to the cam control.

In some embodiments, a cam control method of controlling the cam by means of an ECU (electronic control unit) may comprise the steps of: learning the holding region in which linearity is not ensured, by performing an operation of increasing or decreasing the PWM signal when the cam maintains a holding state; and, based on the results of the learning, generating a final PWM signal, which is the sum of a minimum PWM signal for the cam to leave the holding region and a control PWM signal for the cam to reach a desired position, and outputting same to an oil control valve.

The method may further comprise: the step of the ECU starting the learning when the cam is operating normally, by detecting the phase of the cam as received from the cam position sensor.

The learning step may comprise the steps of: increasing the PWM signal if the cam is positioned in a target area; halting the increase of the PWM signal the instant the position of the cam changes whilst increasing the PWM signal, and storing the PWM signal, the increase of which has been halted, as a holding advance region among the engine conditions; decreasing the PWM signal in the holding advance region; halting the decrease of the PWM signal the instant the position of the cam changes whilst decreasing the PWM signal, and storing the PWM signal, the decrease of which has been halted, as a holding retard region among the engine conditions; and defining the average of the PWM signal in the holding advance region and the PWM signal in holding retard region as a learned value of the holding region.

The step of storing as a holding advance region may comprise the steps of: halting the increase of the PWM signal the instant the position of the cam changes whilst increasing the PWM signal, in order to stop the movement of the cam; decreasing the PWM signal by a fixed amount in order to maintain the holding of the cam; and storing the PWM signal, which has been decreased by the fixed amount, as a holding advance region among the engine conditions.

The step of storing as a holding retard region may comprise the steps of: halting the decrease of the PWM signal the instant the position of the cam changes whilst decreasing the PWM signal, in order to stop the movement of the cam; increasing the PWM signal by a fixed amount in order to maintain the holding of the cam; and storing the PWM signal, which has been increased by the fixed amount, as a holding retard region among the engine conditions.

In some embodiments, an apparatus for controlling the cam by means of an ECU (electronic control unit) may comprise: a learning unit for learning the holding region in which linearity is not ensured, by performing an operation of increasing or decreasing the PWM signal when the cam maintains a holding state; and a control unit which, based on the results of the learning, generates a final PWM signal, which is the sum of a minimum PWM signal for the cam to leave the holding region and a control PWM signal for the cam to reach a desired position, and outputs same to an oil control valve.

The apparatus may further comprise: a cam position sensor for detecting the phase of the cam, and the learning unit can start learning when the cam is operating normally, by detecting the phase of the cam as received from the cam position sensor.

The learning unit may: increase the PWM signal if the cam is positioned in a target area; halt the increase of the PWM signal the instant the position of the cam changes whilst increasing the PWM signal and store the PWM signal, the increase of which has been halted, as a holding advance region among the engine conditions; decrease the PWM signal in the holding advance region; halt the decrease of the PWM signal the instant the position of the cam changes whilst decreasing the PWM signal, and store the PWM signal, the decrease of which has been halted, as a holding retard region among the engine conditions; and define the average of the PWM signal in the holding advance region and the PWM signal in holding retard region as a learned value of the holding region.

The learning unit may: during the storing as the holding advance region, halt the increase of the PWM signal the instant the position of the cam changes whilst increasing the PWM signal, in order to stop the movement of the cam; decrease the PWM signal by a fixed amount in order to maintain the holding of the cam; and store the PWM signal, which has been decreased by the fixed amount, as a holding advance region among the engine conditions.

The learning unit may: during the storing as the holding retard region, halt the decrease of the PWM signal the instant the position of the cam changes whilst decreasing the PWM signal, in order to stop the movement of the cam; increase the PWM signal by a fixed amount in order to maintain the holding of the cam; and store the PWM signal, which has been increased by the fixed amount, as a holding retard region among the engine conditions.

In some embodiments, a method to improve engine performance on the basis of correct responsiveness may include accurately calculating the PWM required when changing the cam position; wherein, when the cam maintains a holding state, the holding PWM range, in which the PWM moves slightly such that linearity is not ensured, is calculated and then applied to the cam control. The advantages of methods and systems incorporating teachings of the present disclosure are not limited to those mentioned above, and other unmentioned advantages should be clearly understandable to a person skilled in the art from the disclosure below.

However, the present invention is not limited to the embodiments set forth below and may be realised in various different forms, and should be understood to include all modifications, equivalents and substitutions which are included in the concept and technical scope of the present invention. The embodiments set forth below are provided to fully disclose the present invention and to allow a person skilled in the technical field to which the present invention belongs to be fully aware of the scope of the invention. In the description of the present invention, when it is considered that the detailed description of related well-known features may obfuscate key features of the present invention, detailed description thereof has been omitted.

Terms used in the present application are merely used to describe specific embodiments and are not intended to limit the scope of the present disclosure. Singular expressions encompass singular and plural expressions unless made evident otherwise from context. In the present application, terms such as "comprising" or "having" are intended to indicate the presence of a feature, number, step, operation, constituent element, component or combination thereof mentioned in the specification, and should be understood not to exclude the presence, or the ability to add, one or more other features or numbers, steps, operations, constituent elements, components or combinations thereof. Terms such as first and second may be used to describe various constituent elements, but these constituent elements are not to be limited by such terms. These terms are used only to differentiate one constituent element from another constituent element.

Hereinbelow, various embodiments are described in detail with reference to the accompanying drawings, and, in the description with reference to the accompanying drawings, the same or corresponding constituent elements have the same figure reference numeral, and duplicate descriptions of same are omitted.

Figure 2:
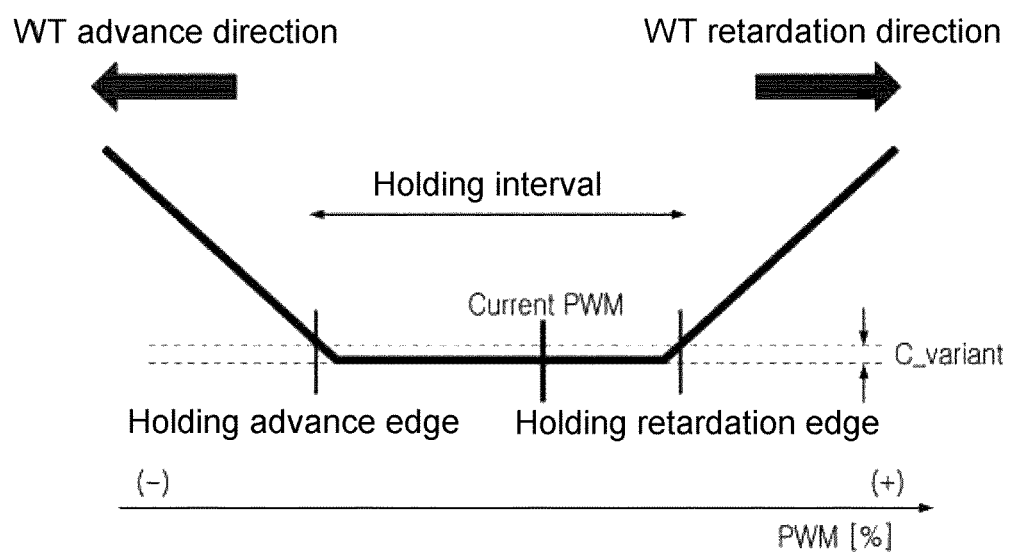
FIG. 2 is a drawing which has been drawn to describe, in general terms, the holding region of the cam control apparatus of FIG. 1.

FIG. 1 is a drawing which shows, in general terms, the cam control apparatus according to an embodiment of the present invention, and FIG. 2 is a drawing which has been drawn to describe, in general terms, the holding region of the cam control apparatus of FIG. 1. With reference to FIG. 1 and FIG. 2, the cam control apparatus may comprise: an oil control valve (110); a hydraulic circuit (120); a cam (130); a lock pin (140); an ECU (200); and a cam position sensor (300).

The oil control valve (OCV) (110) can play the role of changing the direction of a fluid passage along which engine oil, which is supplied from an oil pump (not shown) goes to a variable valve timing unit (VVT) upon receiving control from the ECU (200), thereby controlling the valve opening/closing times. Oil passage control with respect to the hydraulic circuit (120) can be achieved by connecting the hydraulic circuit (120), which is joined to the cam (130) that controls the intake valve and exhaust valve to the oil control valve (110), and by providing the lock pin (140), which fixes the cam (130) in the most retarded and most advanced operating positions, on the hydraulic circuit (120), such that the position of a spool (or plunger) of the oil control valve (110) is moved by a PWM duty signal output from the ECU (200).

When the ECU (200) applies the PWM signal to the oil control valve (100), the position of the spool (or plunger) of the oil control valve (110) moves to a target position, at which time, the position of the cam (130) can be controlled to be a parking (or detent), retard, holding, or advance position in accordance with the hydraulic circuit (120) of the oil. This is to say, depending on the position of the spool (or plunger) of the oil control valve (110), the hydraulic circuit (120) is changed and at the same time operation of the VVT unit can take place.

Here, the responsiveness of the cam (130) depends entirely on control of the PWM signal, and, in such instances, it can happen that responsiveness is lacking or permanent deviation from the target position occurs due to the PWM signal, which has been set for each and every condition, being insufficient or excessive. The root cause of this phenomenon is because the PWM diagram for controlling the cam (130) is not perfectly linear and, in particular, there is a marked problem in the holding PWM region for maintaining the current position.

Hence, using the teachings of the present disclosure, engine performance may be improved on the basis of correct responsiveness by accurately calculating the PWM required when changing the cam (130) position; wherein, when the cam (130) maintains a holding state, the holding PWM range, in which the PWM signal moves slightly such that linearity is not ensured, is calculated and then applied to the cam (130) control.

In some embodiments, the ECU (200) which controls the cam (130) may comprise: a learning unit (210); and a control unit (220). The learning unit (210) can learn the holding region in which linearity is not ensured, by performing an operation of increasing or decreasing the PWM signal when the cam (130) maintains a holding state. Here, the cam position sensor (300) detects the phase of the cam (130) so as to transmit a corresponding signal to the learning unit (210) when the cam (130) is operating normally, and, when the cam (130) is operating normally, the learning unit (210) can start learning.

The learning unit (210) can increase the PWM signal if the cam (130) is maintained in the holding state and is at the same time positioned in a target area. Here, increasing the PWM signal may include increasing a high region in a PWM signal comprising a high region and a low region.

The learning unit (210) can halt the increase of the PWM signal the instant the position of the cam (130) changes whilst increasing the PWM signal, which is to say, the instant the position of the cam (130) leaves a pre-set target (holding advance edge in FIG. 2), in order to stop the movement of the cam (130), and can decrease the PWM signal by a fixed amount in order to maintain the holding of the cam (130), and then can store the PWM signal, which has been decreased by the fixed amount, as a holding advance region among the engine conditions.

When storage of the PWM signal for the holding advance region is completed, the learning unit (210) may decrease the PWM signal for the holding advance region. Here, decreasing the PWM signal may include decreasing a high region in a PWM signal comprising said high region and a low region.

The learning unit (210) can halt the decrease of the PWM signal the instant the position of the cam (130) changes whilst decreasing the PWM signal in a holding advance region, which is to say, the instant the position of the cam (130) leaves a pre-set target (holding retard edge in FIG. 2) in order to stop the movement of the cam (130), and can increase the PWM signal by a fixed amount in order to maintain the holding of the cam (130), and then can store the PWM signal, which has been increased by the fixed amount, as a holding retard region among the engine conditions. In some embodiments, the learning unit (210) proceeds in sequence from advance to retardation during holding region learning, but there is not necessarily any need to learn in the sequence from advance to retardation and it is also possible for learning to take place in a sequence from retardation to advance.

The learning unit (210) may define the average of the PWM signal in the holding advance region and the PWM signal in holding retard region as a learned value of the holding region. Here, the learned value of the holding region may comprise the PWM range of the holding region in which linearity is not ensured.

Based on the results of learning of the learning unit (210), the control unit (220) can generate a final PWM signal, which is the sum of a minimum PWM signal for the cam (130) to leave the holding region and a control PWM signal for the cam (130) to reach a desired position, and can output same to an oil control valve (110). Accordingly, the PWM required when changing the position of the cam (130) can promote improvement of engine performance on the basis of quick responsiveness by accurately computing the PWM required when changing the position of the cam (130) as the sum of a minimum PWM signal for leaving the holding region and a control PWM signal for reaching a desired position.

Figure 3:
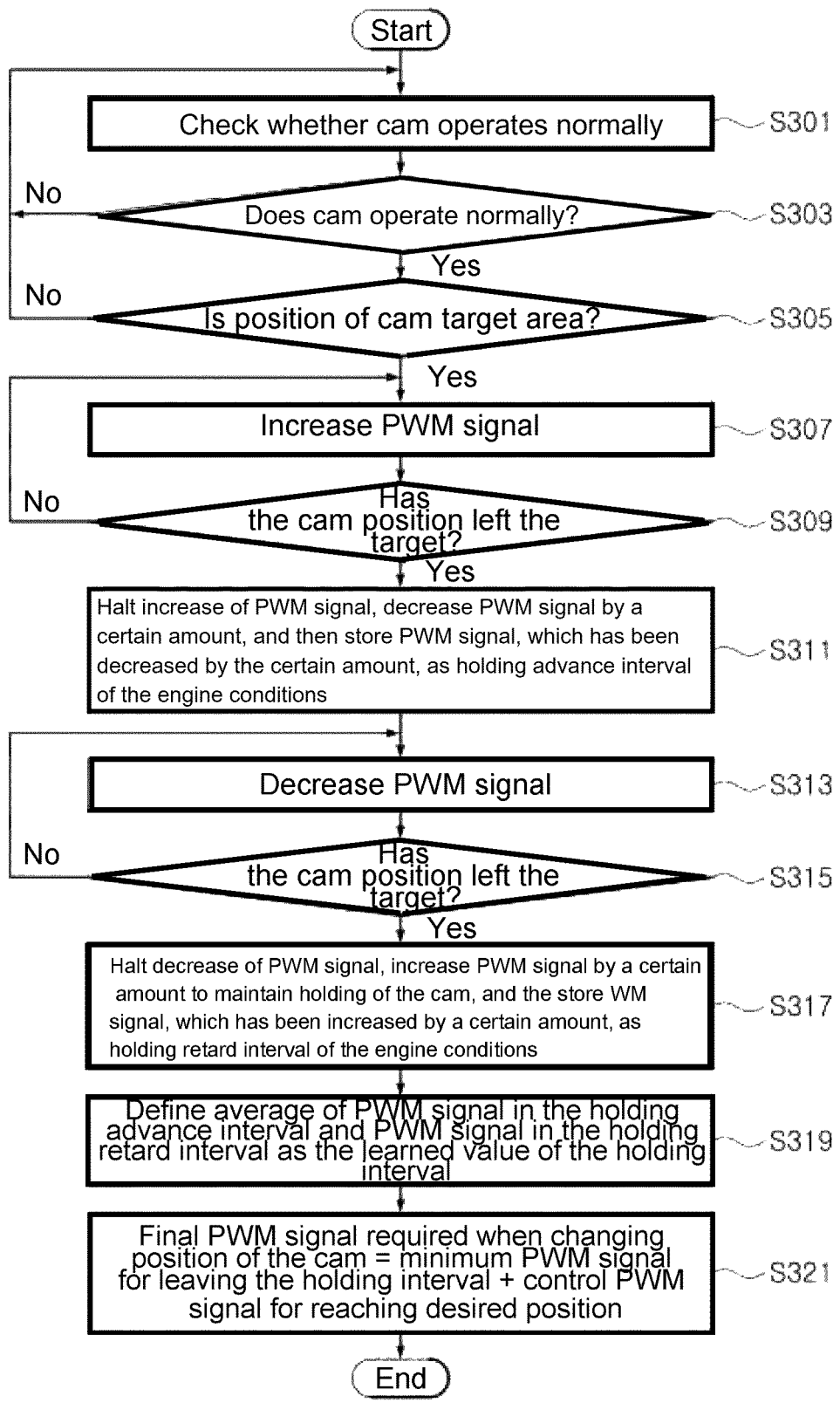
FIG. 3 is a flowchart for explaining an example cam control method incorporating teachings of the present disclosure.

FIG. 3 is a flowchart for an example cam control method according incorporating teachings of the present disclosure. In the description below, description of those parts where the description with respect to FIG. 1 and FIG. 2 would be duplicated are omitted.

In step S301, the ECU (200) receives a signal from the cam position sensor (300) so as to check whether the cam (130) is operating normally.

In step S303, the ECU (200) receives the phase of the cam (130) from the cam position sensor (300) so as to start learning when the cam is operating normally.

In step S305, the ECU (200) determines whether the position of the cam (130) is the target area when the cam (130) maintains a holding state.

In step S307, when the position of the cam (130) is the target area, the ECU (200) increases the PWM signal so as to output same to the oil control valve (110). Here, increasing the PWM signal may include increasing a high region in a PWM signal comprising said high region and a low region.

In step S309, the ECU (200) determines whether the position of the cam (130) has left the pre-set target whilst increasing the PWM signal.

In step S311, when the position of the cam (130) has left the pre-set target, the ECU (200) halts the increase of the PWM signal the instant the position of the cam (130) leaves the pre-set target, which is to say, the instant the position of the cam (130) changes, in order to stop the movement of the cam (130), and decreases the PWM signal by a fixed amount in order to maintain the holding of the cam (130), and then stores the PWM signal, which has been decreased by the fixed amount, as a holding advance region among the engine conditions.

In step S313, when storage of the PWM signal with respect to the holding advance region is completed, the ECU (200) decreases the PWM signal in the holding advance region. Here, decreasing the PWM signal may include decreasing a high region in a PWM signal comprising said high region and a low region.

In step S315, the ECU (200) determines whether the position of the cam (130) has left the pre-set target whilst decreasing the PWM signal in the holding advance region.

In step S317, when the position of the cam (130) has left the pre-set target, the ECU (200) halts the decrease of the PWM signal the instant the position of the cam (130) leaves the target, which is to say, the instant the position of the cam (130) changes in order to stop the movement of the cam (130), and increases the PWM signal by a fixed amount in order to maintain the holding of the cam (130), and then stores the PWM signal, which has been increased by a fixed amount, as a holding retardation region among the engine conditions.

In step S319, the ECU (200) defines the average of the PWM signal in the holding advance region and the PWM signal in holding retard region as a learned value of the holding region.

In step S321, the ECU (200) sets the final PWM signal, which is required when changing the position of the cam (130) subsequently to a value which is the sum of a minimum PWM signal for leaving the holding region and a control PWM signal for reaching a desired position.

The embodiments described herein may be implemented using a computer program which can be executed through various constituent elements in a computer, and such a computer program may be recorded on a computer-readable medium. In such a case, the medium may comprise hardware devices specially configured to store and execute program commands, including: magnetic media such as hard discs, floppy discs, and magnetic tapes; optical recording media such as CD-ROMs and DVDs; magneto-optical medium such as floptical discs; and ROM, RAM and flash memories. Examples of the computer program can include machine language code such as that created by means of a compiler, as well as high-level language code which can be executed by means of a computer by using an interpreter or the like.

In the present disclosure the use of the word "the" and similar demonstrative wording may entail both the singular and the plural. Furthermore, when a range is mentioned in the present disclosure, this includes any embodiment in which individual values belonging to the range have been applied (unless there is a statement to the contrary), and this is the same as for statements of individual values constituting ranges in the detailed description herein.

With respect to the steps which constitute methods incorporating teachings of the present disclosure, said steps may be performed in any appropriate order unless the order is clearly stated or there is a statement to the contrary. In all events, the teachings herein are not limited by the disclosed order of the steps. The use of all the embodiments or illustrative wording (for example, etc.) is simply in order to describe the teachings in detail, but the scope of the present disclosure is not limited by the above embodiments or illustrative wordings since they are not delimited by the claims. Furthermore, a person skilled in the art will be able to understand that various amendments, combinations and modifications can be implemented in accordance with design conditions and other factors within scope of the attached claims or equivalents thereof.

Accordingly, the concept of the present disclosure is not defined so as to be limited to the described embodiments; and the scope of the concept of the teachings herein encompasses not only the claims below but also an entire scope in which changes equal to the claims or equivalently modified therefrom are made.

DESCRIPTION OF THE REFERENCE NUMERALS

110: Oil control valve
120: Hydraulic circuit
130: Cam
140: Lock pin

200: ECU
210: Learning unit
220: Control unit
300: Cam position sensor

What is claimed is:

1. A method for controlling a cam using an ECU (electronic control unit), the method comprising:
learning a holding region in which linearity is not ensured by increasing or decreasing a pulse width modulation (PWM) signal while the cam maintains a holding state;
based on the holding region, generating a final PWM signal;
wherein the final PWM signal comprises a sum of a minimum PWM signal for the cam to leave the holding region and a control PWM signal for the cam to reach a desired position; and
transmitting the final PWM signal to an oil control valve;
wherein learning the holding region comprises:
increasing the PWM signal if the cam is positioned in a target area;
halting the increase of the PWM signal at an instant in which a position of the cam changes whilst increasing the PWM signal, and storing the PWM signal, the increase of which has been halted, as a holding advance region among a set of engine conditions;
decreasing the PWM signal in the holding advance region;
halting the decrease of the PWM signal at an instant the position of the cam changes whilst decreasing the PWM signal, and storing the PWM signal, the decrease of which has been halted, as a holding retard region among the set of engine conditions; and
defining an average of the PWM signal in the holding advance region and the PWM signal in the holding retard region as a learned value of the holding region.

2. The method for controlling the cam according to claim 1, further comprising starting the learning while the cam is operating normally, based on detection of a phase of the cam using a cam position sensor.

3. The method for controlling the cam according to claim 1, wherein storing the PWM signal comprises:
halting the increase of the PWM signal at the instant the position of the cam changes whilst increasing the PWM signal, in order to stop a movement of the cam;
decreasing the PWM signal by a fixed amount in order to maintain holding of the cam; and
storing the PWM signal, which has been decreased by the fixed amount, among the set of engine conditions.

4. The method for controlling the cam according to claim 1, wherein storing the PWM signal as the holding retard region comprises:
halting the decrease of the PWM signal at the instant the position of the cam changes whilst decreasing the PWM signal, in order to stop the movement of the cam;
increasing the PWM signal by a fixed amount in order to maintain holding of the cam; and
storing the PWM signal, which has been increased by the fixed amount, among the set of engine conditions.

5. An apparatus for controlling a cam, the apparatus comprising:
an electronic control unit (ECU) with a learning unit for learning a holding region in which linearity is not ensured by performing an operation of increasing or decreasing a pulse width modulation (PWM) signal while the cam maintains a holding state; and
a control unit in the ECU which, based on the holding region, generates a final PWM signal;
wherein the final PWM signal comprises a sum of a minimum PWM signal for the cam to leave the holding region and a control PWM signal for the cam to reach a desired position; and
wherein the ECU transmits the final PWM signal to an oil control valve;
wherein the learning unit:
increases the PWM signal if the cam is positioned in a target area;
halts the increase of the PWM signal at an instant a position of the cam changes whilst increasing the PWM signal, and stores the PWM signal, the increase of which has been halted, as a holding advance region among a set of engine conditions;
decreases the PWM signal in the holding advance region;
halts the decrease of the PWM signal at an instant the position of the cam changes whilst decreasing the PWM signal, and stores the PWM signal, the decrease of which has been halted, as a holding retard region among the set of engine conditions; and
defines an average of the PWM signal in the holding advance region and the PWM signal in the holding retard region as a learned value of the holding region.

6. The apparatus for controlling the cam according to claim 5, further comprising a cam position sensor for detecting an instantaneous phase of the cam;
wherein the learning unit starts learning when the cam is operating normally based on a detected phase of the cam received from the cam position sensor.

7. The apparatus for controlling the cam according to claim 5, wherein the learning unit, during the storing as the holding advance region, halts the increase of the PWM signal at the instant the position of the cam changes whilst increasing the PWM signal, in order to stop movement of the cam; decreases the PWM signal by a fixed amount in order to maintain holding the cam; and stores the PWM signal, which has been decreased by the fixed amount, as the holding advance region among the set of engine conditions.

8. The apparatus for controlling the cam according to claim 5, wherein the learning unit, during the storing as the holding retard region, halts the decrease of the PWM signal the instant the position of the cam changes whilst decreasing the PWM signal, in order to stop movement of the cam; increases the PWM signal by a fixed amount in order to maintain holding the cam; and stores the PWM signal, which has been increased by the fixed amount, as the holding retard region among the set of engine conditions.

* * * * *